United States Patent [19]

Geneviéve

[11] Patent Number: 4,890,189
[45] Date of Patent: Dec. 26, 1989

[54] LIGHTNING PROTECTIVE DEVICE FOR MOBILE RADAR ANTENNA
[75] Inventor: Deville Geneviéve, Paris, France
[73] Assignee: Thomson-CSF, Paris, France
[21] Appl. No.: 160,404
[22] Filed: Feb. 25, 1988
[30] Foreign Application Priority Data
  Mar. 6, 1987 [FR] France .................. 87 03070
[51] Int. Cl.$^4$ .............................. H02H 3/22
[52] U.S. Cl. ................. 361/222; 361/220; 174/2; 343/720
[58] Field of Search ............... 361/117, 212, 216, 217, 361/218, 220, 219, 222; 174/2, 3; 343/720, 882, DIG. 1; 324/72

[56] References Cited
U.S. PATENT DOCUMENTS

| 2,160,053 | 5/1939 | Barbour | 250/33 |
| 2,337,710 | 12/1943 | Cowan | 343/720 |
| 3,125,757 | 3/1964 | Scheldorf | 343/720 |
| 4,016,462 | 4/1977 | Pavliny | 361/117 |
| 4,573,115 | 2/1986 | Halgrimson | 364/138 |
| 4,583,702 | 4/1986 | Baldwin | 244/11 |

Primary Examiner—A. D. Pellinen
Assistant Examiner—David Osborn
Attorney, Agent, or Firm—Roland Plottel

[57] ABSTRACT

A lightning protective device for a ground based mobile radar antennas of the type which moves round a vertical axis. The device includes: an electrically conductive rod, located near the antenna which is placed outside the transmission and reception sector of the antenna. A first or top end of the rod is higher than the antenna. An electrically insulating rigid support connects the rod and the antenna and transfers rotation of the antenna to the rod, thus keeping the rod outside the transmission and reception sector of the antenna. A fixed electrically conductive circular rail is placed below and around the antenna, and several electrically conductive elements are connected to the rod to the rail, and to the insulating rigid support so as to rotate with the antenna and the rod, and include an electrically conductive skid which rubs against the circular rail, thus providing for an electrical contact between the rotatiing rod and the rail which is connected to ground.

19 Claims, 3 Drawing Sheets

FIG_1
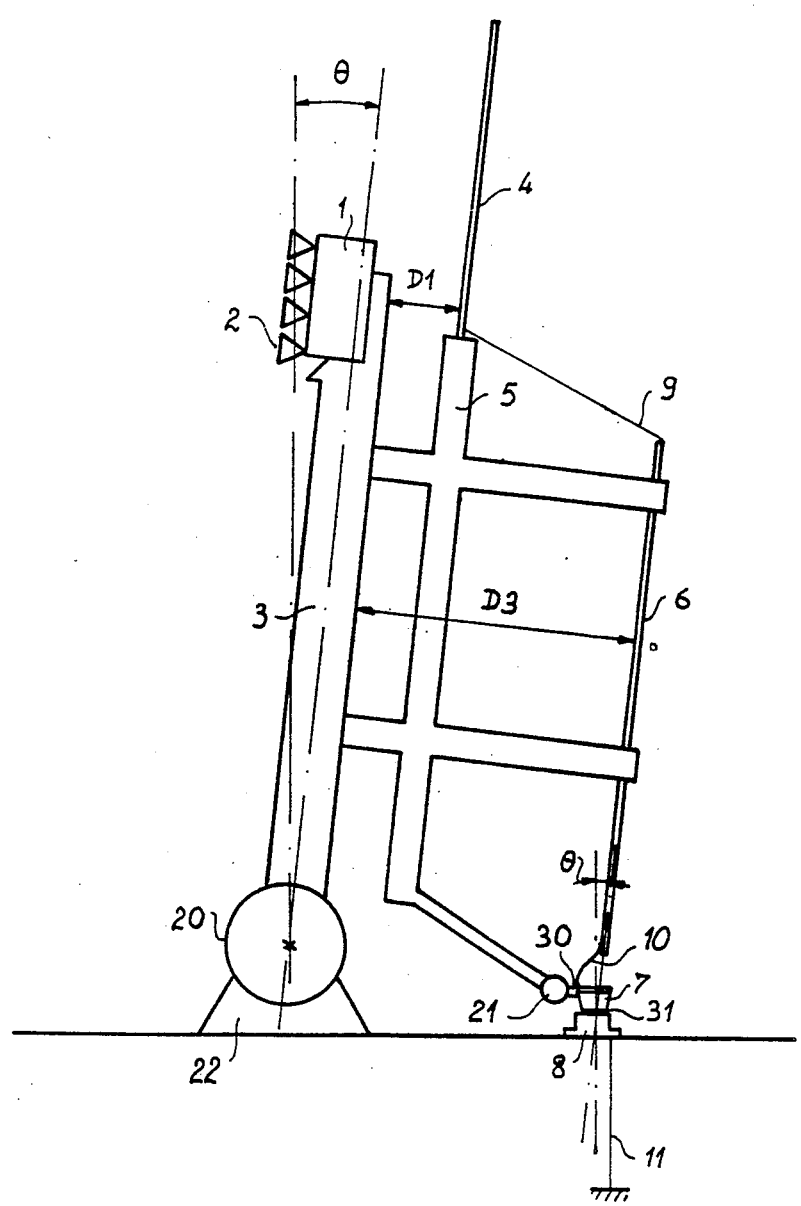

FIG_2
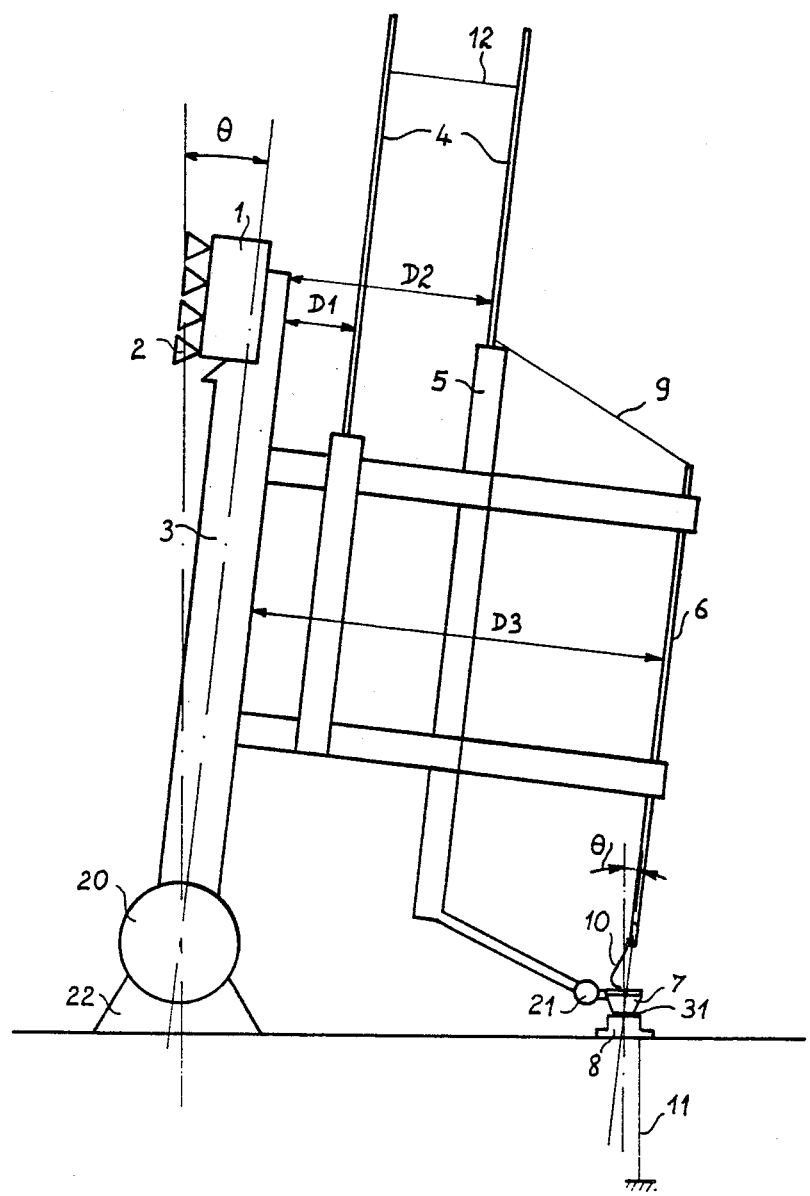

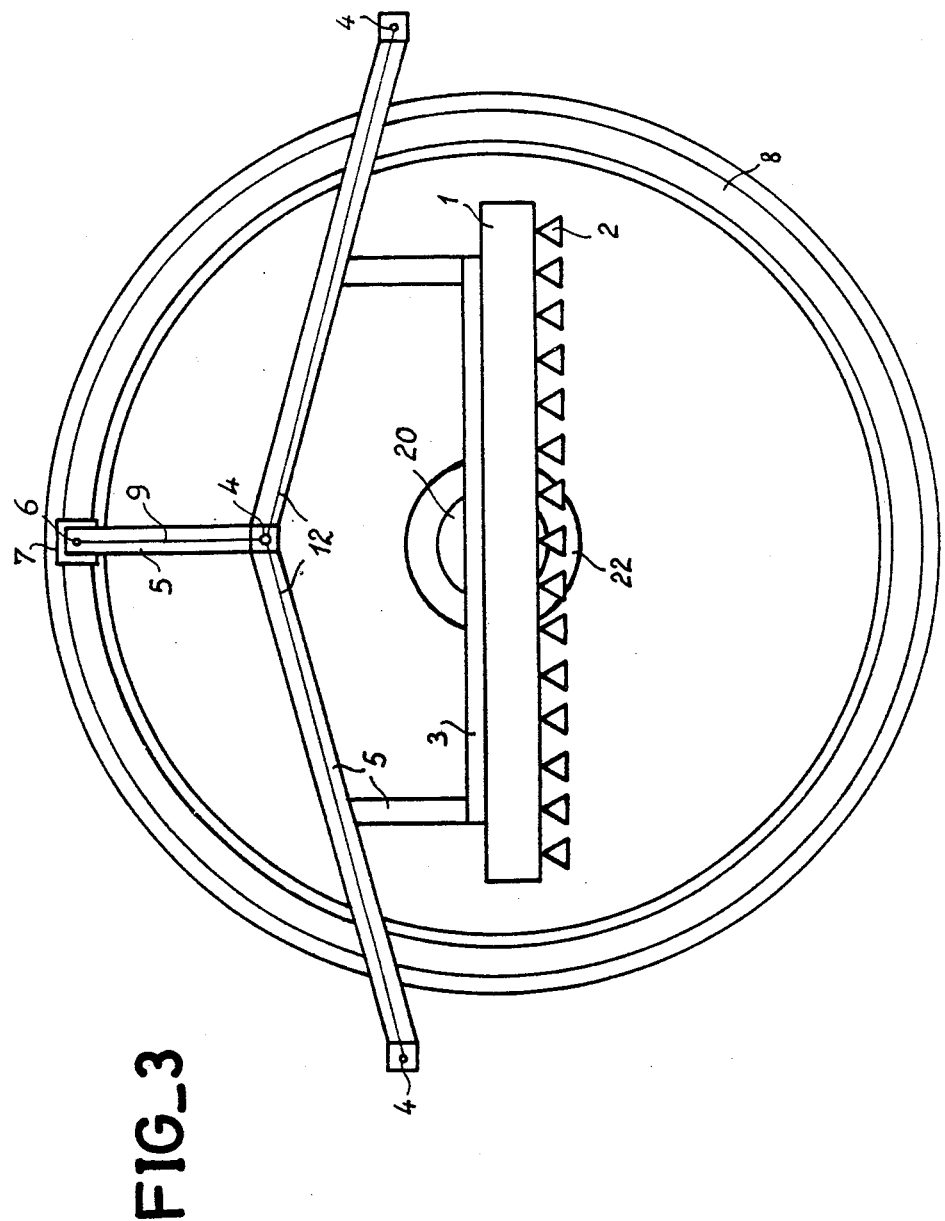
FIG_3

LIGHTNING PROTECTIVE DEVICE FOR MOBILE RADAR ANTENNA

BACKGROUND OF THE INVENTION

1. Field of the Invention

The present invention pertains to a lightning protective device for mobile radar antenna, a device that does not disturb the functioning of the antenna by its presence in the said antenna's transmission or reception sector.

2. Description of the Prior Art

Radar antennas have parts that are very vulnerable to lightning: these parts are the radiating elements and the electronic components that are located behind these radiating elements.

Antennas with one or more reflectors are far less fragile than electronic scanning antennas. For a reflector is a metallic part, generally a grid, that is insensitive to lightning, conducts electricity and is electrically connected to the ground: it gives partial lightning protection to the radiating elements and electronic components. In other words, it acts as a lightning conductor. No part of an electronic scanning antenna can fulfil this type of role.

Electronic scanning antennas which are, moreover, very expensive, must imperatively be protected from lightning.

An object is normally protected from lightning by a lightning conductor consisting of one or more fixed metallic rods which are located near the object to be protected, overhang the said object and are electrically connected to the ground, thus making it possible to remove heavy electric charges.

Unfortunately, a device of this type is ill-suited to the lightning protection of a radar antenna. For a radar antenna transmits or receives energy in several sectors of space. In particular, certain antennas explore every direction in the horizontal plane. Now an ordinary lightning conductor has at least one fixed metallic rod which overhangs the antenna to be protected and which is electrically connected to the ground by at least an electrically conductive element which is, itself, also generally metallic. The set comprising this element and the rod are therefore inevitably, at a given moment, in the transmission or reception sector of the antenna, and its presence in this sector greatly disturbs the functioning of the antenna.

In the prior art, there are collapsible lightning conductors which are put away in fine weather and which are set up when there is a danger of storms. The erection of the lightning conductor is controlled by a storm detector which measures the electrical field and the magnetic field of the surrounding atmosphere. An antenna protected by a lightning conductor of this type works normally in fine weather and can only be disturbed when there is a threat of stormy weather which is taken to be brief in comparison with fine weather.

However, a collapsible lightning conductor has disadvantages. First, it is a costly device. Second, it requires the use of storm detectors which add to the cost. Secondly, it is a device that does not resolve the problems raised by a lightning conductor which is fixed in a highly keronic region, i.e. a region where there is a high frequency of storms as, for example, in a tropical zone.

SUMMARY OF THE INVENTION

The object of the present invention is a lightning protective device for a mobile radar antenna, namely a radar antenna lightning conductor which removes the above disadvantages because, firstly, it is placed outside the transmission or reception sector of the antenna, i.e. behind this antenna, and, secondly, it is driven by a motion which is integrally related to the motion of the mobile antenna. Thus, it remains constantly outside the transmission or reception sector of the antenna.

More precisely, the object of the invention is a lightning protective device for a mobile radar antenna comprising at least one electrically conductive rod, located near the antenna, overhanging it, electrically insulated from it and electrically connected to charge-removing means, said device being placed outside the transmission or reception sector of the antenna, and being driven by a motion integrally related to that of the mobile antenna and this remaining constantly outside the transmission or reception sector of the antenna.

BRIEF DESCRIPTION OF THE DRAWINGS

Details and specific features of the invention will emerge from the following description, made with reference to the appended drawings of which:

FIG. 1 is a side-face view of a first embodiment of a device according to the invention, comprising a single rod;

FIG. 2 is a side-face view of a second embodiment of a device according to the invention, comprising three rods;

FIG. 3 is a top view of the preceding figure.

These various figures have not been drawn to real scale. Furthermore, the same references are repeated for the same elements.

DESCRIPTION OF PREFERRED EMBODIMENTS

The invention pertains to a lightning protective device, i.e. a lightning conductor, for a mobile radar antenna.

An ordinary lightning conductor for a mobile radar antenna is fixed, and is periodically located in the transmission or reception sector of the antenna. Its presence in this sector disturbs the working of the antenna by altering its radiation chart: the ratio between the major lobe area and the secondary lobes area decreases: in other words, the directivity of the antenna deteriorates. This phenomenon is all the greater as the lightning conductor approaches the center of the field radiated by the antenna.

According to the invention, this disadvantage is removed by making the lightning conductor remain constantly outside the antenna transmission or reception sector, namely behind this antenna. The principle of the invention thus consists in placing the lightning conductor behind the antenna and driving it by a motion integrally related to that of the antenna.

FIG. 1 shows a first embodiment of a device according to the invention. This figure shows an antenna 1 comprising radiating elements 2. The antenna 1 is supported by a turret 3 mounted on a base 22. For example, this antenna 1 is an electronic scanning antenna in the vertical plane and explores the horizontal plane through mechanical rotation on a substantially vertical axis. The lightning protective device according to the invention, which protects the moveable antenna 1, comprises the following elements:

an electrically conductive rod 4, located behind the antenna 1, near the said antenna and overhanging it. This rod has a cross-section of any shape. In practice, the shape of the cross-section of this rod is chosen according to criteria relating to firstly, mechanical resistance and, secondly, machining ease. For example, this rod is a cylindrical tube;

an electrically conductive lightning downlead 6 which is preferably rigid, the said rigidity making it more solid;

an electrically conductive connecting cable 9 which electrically connects the rod 4 and the lightning downlead 6;

an electrically conductive skid 7;

a connecting braid 10 which electrically connects the lightning downlead 6 and the skid 7;

an electrically conductive circular rail 8;

an electrically conductive rod 11, that penetrates into the ground and comprises means to remove heavy electrical charges during a lightning stroke, the said means being known to those skilled in the art. These means to remove charges may consist of several rods 11. To simplify the drawing, only one rod 11 is shown in FIG. 1.

The rod 4, the lightning downlead 6, the connecting cable 9, the skid 7 and the connecting braid 10 are moveable and driven by a motion which is integrally related to that of the antenna 1. A rigid and electrically insulating support 5 provides a mechanical connection between the antenna and the five moveable elements mentioned above. This support thus provides the rigid connection for interdependent motion. The circular rail 8 and the rod 11 are themselves fixed. The skid 7 rubs against the circular rail 8 providing permanent electrical contact between the moveable elements and the fixed elements. The skid 7 preferably comprises:

an electrically conductive friction band 31, made of graphite for example which minimizes risks of welding between the said skid 7 and the circular rail 8: there is a risk that welding of this type will be created by heating during a stroke of lightning;

a system of springs 30 providing appropriate contact between the skid 7 and the circular rail 8.

To avoid breakdown during a stroke of lightning, the rod 4 is at a sufficiently great distance D1 from the antenna 1. This distance D1 can be estimated by those skilled in the art. For the same reason, the lightning downlead 6 and the turret 3 are separated by a distance D3 which can also be estimated by prior art methods.

The device according to the invention possesses flexibility so that it will not be damaged by wind. Mechanical means 20 and 21 enable the assembly constituting the antenna 1, comprising the radiating elements 2, the turret 3, the rod 4, the lightning downlead 6, the connecting cable 9, the skid 7 and the connecting braid 10, as well as the insulating support 5 to oscillate slightly under wind, while the circular rail 8, the rod 11 and the base 22 of the antenna 1 remain fixed. This flexibility is shown schematically in FIG. 1 by an angle $\Theta$ between the vertical direction and the axis of the turret 3 supporting the antenna 1. Any prior art mechanical means 20 and 21 providing this flexibility can be used in the device of the invention. Furthermore, the connecting cable 9 is preferably flexible.

The lightning protective device for a mobile radar antenna, shown schematically in FIG. 1, comprises only one rod 4 of any chosen height. The number and height of the rods 4 of the device according to the present invention are determined, for example, by means of a so-called "electro-geometrical" model described by Mr. Claude Gary in an article, *Les principes physiques guidant la protection des batiments contre la foudre* (Physical Principles Guiding the Lightning Protection of Buildings) in the Journal R.G.E., Vol. 89, No. 5, May 1980. The number n of lightning downleads 6, which is quite obviously identical to that of the connecting cables 9, the skids 7 and the connecting rods 10, is smaller than or equal to the number N of the rods 4. Should n be smaller than N, several rods 4 are connected electrically to one another. An embodiment of a configuration of this type is described below and is illustrated by FIG. 2.

FIG. 2 is a schematic view of a second embodiment of a device according to the invention, seen in a side-face view, comprising three rods 4 and a single lightning downlead 6. These numbers of rods 4 and lightning downleads 6 are chosen as examples. If the antenna 1 to be protected is part, for example, of a tracking radar and not a surveillance radar, the inertia of the lightning protection device of this antenna 1 should not be too high. This is why it is possible, preferably, to choose a number of lightning downleads 6 which is strictly smaller than the number of rods 4. However, each rod 4 should be electrically connected to a lightning downlead 6. In FIG. 2, one of the rods 4 is electrically connected to a lightning downlead 6 by a connecting cable 9, and the other two rods 4, one of which conceals the other in this side-face view, are connected to the first rod by means of electrically conductive connecting cables 12 which are preferably flexible. The other elements shown in FIG. 2 are similar to the ones shown in FIG. 1.

FIG. 3 shows the same elements as those of FIG. 2, but in a top view and not a side-face view. To simplify this figure, the angle 8 has been chosen as being equal to zero. This top view shows the circular shape of the rail 8 as well as the position of the three rods 4, located behind the antenna.

The two embodiments of the device according to the invention, respectively illustrated by FIG. 1 and by FIGS. 2 and 3, comprises only one electrically conductive circular rail 8. A device according to the invention may comprise several concentric rails 8, electrically connected to one another, in order to prevent breakdown during a lightning stroke. This type of an embodiment of the device according to the invention has not been illustrated by any figure. For a device according to the invention, comprising several rails 8, necessarily has more lightning downleads 6 than a device according to the invention comprising only one rail 8. Consequently, its inertia is greater, and this is a disadvantage as explained earlier.

What is claimed is:

1. A lightning protective device for a ground base mobile radar antenna, said antenna comprising rotation means for moving around a substantially vertical axis, said device comprising:

at least one electrically conductive rod, located near said antenna and placed outside the transmission and reception sector of the antenna, a first end of said rod being higher than said antenna, electrical insulation and driving means for insulating said rod from said antenna, and charge-removal means, electrically connected to a second end of said rod, wherein said rod is electrically connected to said charge-removal means through:
an electrically conductive connecting cable with a first end connected to said second end of said rod, said driving means further providing said connecting cable with a motion integrally related to that of said antenna;
an electrically conductive lightning downlead with its upper end connected to a second end of said connecting cable, said driving means further providing said lightning downlead with a motion integrally related to that of said antenna;
an electrically conductive connecting braid with a first end connected to a bottom end of said lightning downlead, said driving means further providing said connecting braid with a motion integrally related to that of said antenna;
an electrically conductive skid, connected to a second end of said connecting braid, said driving means further providing said skid with a motion integrally related to that of said antenna; and
a fixed, electrically conductive, circular rail which is electrically connected to said charge-removal means;
said moveable skid rubbing against said fixed circular rail.

2. A device according to claim 1 further comprising a system of springs keeping said skid in electrical contact with said circular rail.

3. A device according to claim 1 wherein said skid has a graphite friction band on its side placed against said circular rail, said friction band minimizing risks of welding said welding being due to heating, during lightning strokes, between said moveable skid and said fixed circular rail.

4. A device according to claim 1, wherein said electrical insulation and driving means comprises an electrically insulating and rigid support, said support providing for a mechanical connection between said antenna and all the elements of the lightning conductor and comprises said rod, said connecting cable, said lightning downlead, said connecting braid and said skid.

5. A device according to claim 1 further comprising a turret that supports said antenna, and further comprising mechanical means enabling said turret, said rod, said connecting cable, said lightning down load, said connecting braid, said electrical insulation means, and said driving means to oscillate slightly under the effect of wind.

6. A lightning protective device for a ground based mobile radar antenna, said antenna comprising rotation means for moving around a substantially vertical axis, said device comprising:
at least one electrically conductive rod, located near said antenna and placed outside the transmission and reception sector of the antenna, a first end of said rod being higher than said antenna,
electrical insulation and driving means for insulating said rod from said antenna, and
charge-removal means, electrically connected to a second end of said rod, further comprising several rods certain of these rods being electrically connected to one another by electrically conductive connecting cables, said device thus comprising a group of rods that are electrically connected to one another, said group being electrically connected to said charge-removal means through:
an electrically conductive connecting cable with a first end connected to said second end of said rod, said driving means further providing said connecting cable with a motion integrally related to that of said antenna;
an electrically conductive lightning downlead with its top part connected to the second end of said connecting cable, said driving means further providing said lightning downlead with a motion integrally related to that of said antenna;
an electrically conductive connecting braid which has a first end connected to the lower part of said lightning downlead, said driving means further providing said connecting braid with a motion integrally related to that of said antenna;
an electrically conductive skid connected to a second end of said connecting braid, said driving means further providing said conductive skid with a motion integrally related to that of said antenna;
an electrically conductive circular rail which is fixed and electrically connected to said charge-removal means;
said moveable skid rubbing against said fixed circular rail.

7. A device according to claim 6 further comprising a system of springs that keeps said skid in electrical contact with said circular rail.

8. A device according to claim 6 wherein said skid comprises a graphite friction band on its side placed against said circular rail, said friction band minimizing the risk of welding due to heating during lightning strokes, between said moveable skid and said fixed circular rail.

9. A device according to claim 6 wherein said electrical insulation and driving means consist of a rigid and electrically insulating support providing mechanical connection between said antenna and all the elements of the lightning conductor consisting of: said group of rods, said connecting cable, said lightning downlead, said connecting braid and said skid.

10. A device according to claim 6 further comprising a turret that supports said antenna and further comprising mechanical means enabling said turret, said group of rods, said connecting cable, said lightning downlead, said connecting braid, said electrical insulation means, and said driving means to oscillate slightly under the effect of wind.

11. A lightning protective device for a ground based rotating radar antenna which rotates around a substantially vertical axis, said device comprising:
at least one electrically conductive rod, located near said antenna and placed outside the transmission and reception sector of said antenna, a first end of said rod being higher than said antenna,
an electrically insulating rigid support for transmitting the rotation of said antenna to said rod, and for keeping said rod outside the transmission and reception sector of said antenna,
electrically conductive elements comprising a first part which is connected to an end of said rod which is opposite to its first end, said rigid support further providing for a transmission of the rotation of said antenna to said conductive elements,
a fixed electrically conductive circular rail, said conductive elements further comprising a second part which rubs against said circular rail thus providing for an electrical connection between said conductive elements and said circular rail, and fixed charge removal means electrically connected to said circular rail.

12. A device according to claim 11 wherein said electrically conductive elements comprise:
an electrically conductive connecting cable with a first end connected to the end of said rod which is opposite to its first end, said connecting cable forming said first part of said conductive elements,
an electrically conductive lightning downlead with its upper end connected to the end of said connecting cable which is opposite to its first end,
an electrically conductive connecting braid with a first end connected to the end of said lightning downlead which is opposite to its upper end,
an electrically conductive skid connected to an end of said connecting braid which is opposite to its first end, said skid forming said second part of said conductive elements.

13. A device according to claim 12 further comprising a system of springs keeping said skid in electrical contact with said circular rail.

14. A device according to claim 12 wherein said skid has a graphite friction band on its side placed against said circular rail, said friction band minimizing risks of welding, said welding being due to heating, during lightning strokes, between said moveable skid and said fixed circular rail.

15. A device according to claim 12 further comprising a turret that supports said antenna, and further comprising mechanical means enabling said turret, said rod, said connecting cable, said lightning downlead, said connecting braid and said driving means to oscillate slightly under the effect of wind.

16. A device according to claim 11 comprising several rods some of which are electrically connected to one another by electrically conductive connecting cables, said device thus comprising at least one group of rods that are electrically connected to one another, said group being connected to said first part of said conductive elements, said conductive elements comprising:
an electrically conductive connecting cable with a first end connected to said group, said connecting cable forming said first part of said conductive elements,
an electrically conductive lightning downlead with its upper end connected to the end of said connecting cable which is opposite to its first end,
an electrically conductive connecting braid with a first end connected to the end of said lightning downlead which is opposite to its upper end,
an electrically conductive skid connected to an end of said connecting braid which is opposite to its first end, said skid forming said second part of said conductive elements.

17. A device according to claim 16 further comprising a system of springs that keeps said skid in electrical contact with said circular rail.

18. A device according to claim 16 wherein said skid comprises a graphite friction band on its side placed against said circular rail, said friction band minimizing the risk of welding, due to heating during lightning strokes, between said moveable skid and said fixed circular rail.

19. A device according to claim 16 further comprising a turret that supports said antenna and further comprising mechanical means enabling said turret, said group of rods, said connecting cable, said lightning downlead, said connecting braid, and said driving means to oscillate slightly under the effect of wind.

* * * * *